Patented Dec. 30, 1930

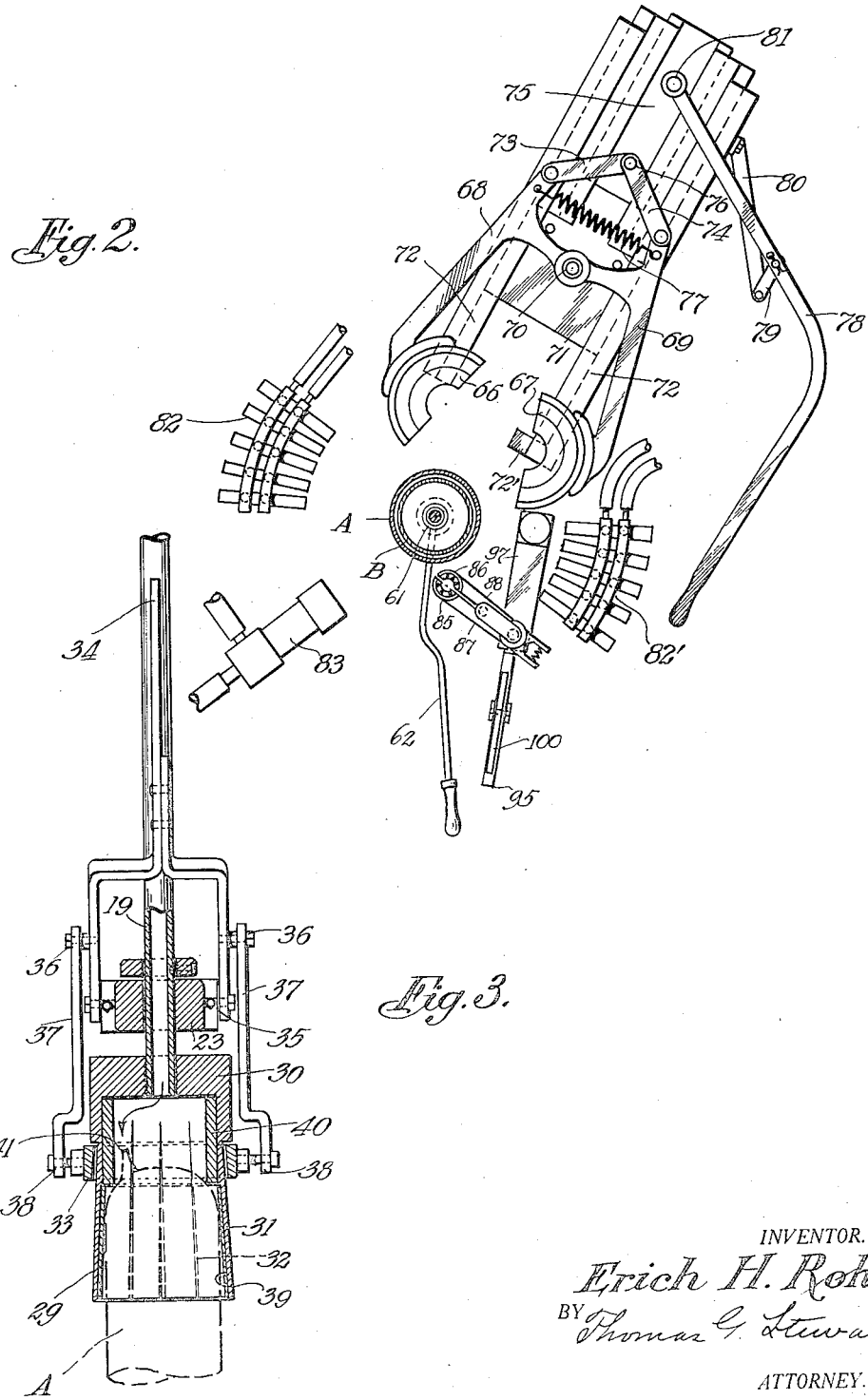

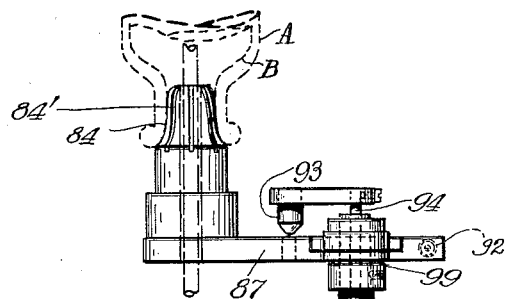
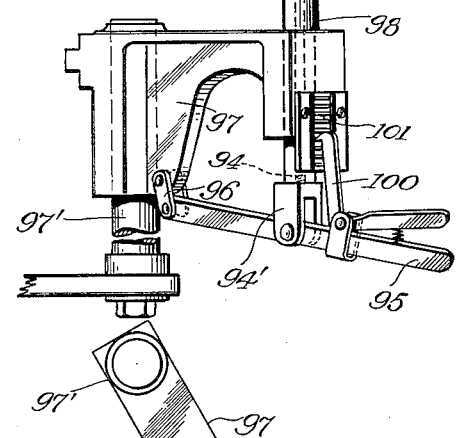
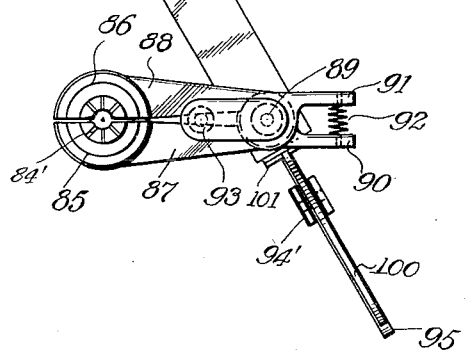

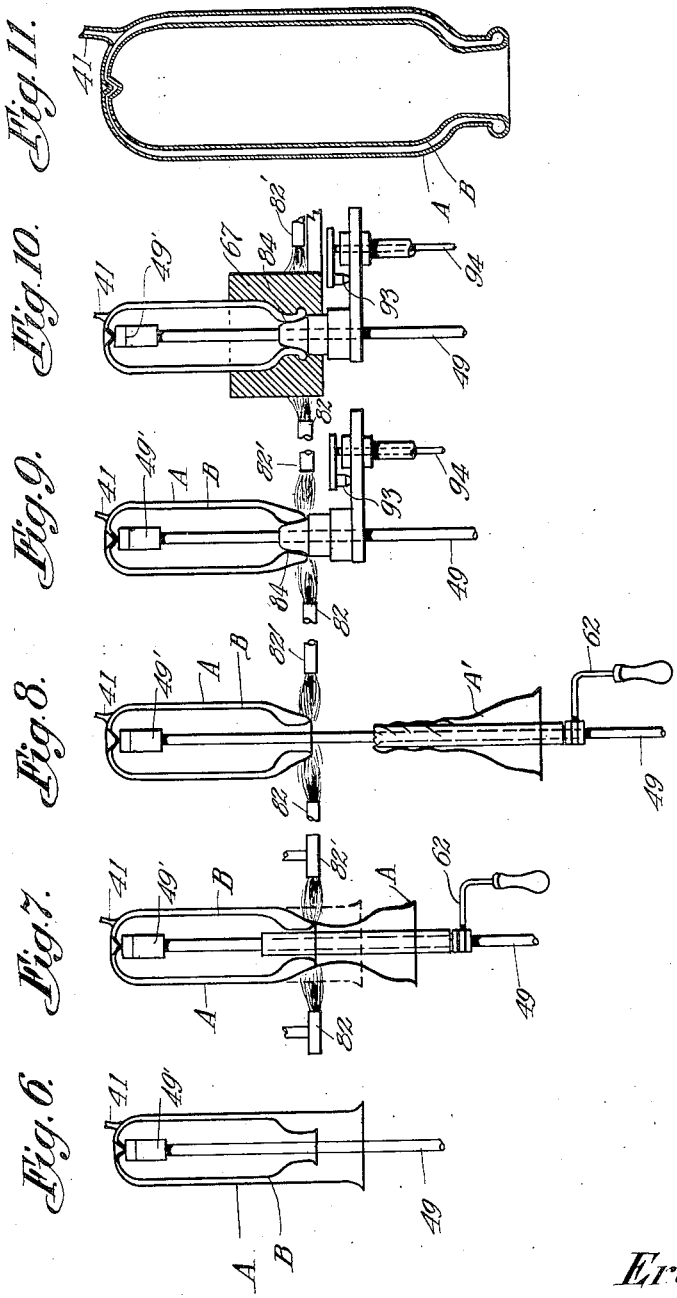

1,786,456

UNITED STATES PATENT OFFICE

ERICH H. ROHL, OF CHICAGO, ILLINOIS, ASSIGNOR TO THE MANTLE LAMP COMPANY OF AMERICA, OF CHICAGO, ILLINOIS, A CORPORATION

METHOD OF AND APPARATUS FOR ASSEMBLING GLASS BLANKS

Application filed December 15, 1924. Serial No. 756,137.

The invention relates to a machine for uniting the blanks constituting the outer and inner wall of a vacuum bottle, and it also appertains to a method whereby the union of these blanks and the final shaping of the vacuum bottle are facilitated and perfected.

Generally speaking, the machine in which the invention is embodied includes means for holding the outer blank in an inverted position during the performance of the process; means for holding the inner blank in an inverted position within the outer blank and concentric therewith until the shaping of the two blanks is complete and said blanks are autogenously welded together at their necks; means for synchronously rotating said blanks; and means for heating the pendent edges of said blanks to render them pliable while they are being molded: and, subsequently, to cause them to fuse and unite. Other features of the machine will appear.

The object of operating upon the blanks while rotating in pendent positions, is to take advantage of gravity to facilitate the shaping of the product, and to avoid the tendency to distortion, inherent to forming the glass in other than a pendent position.

The machine is essentially part hand controlled and automatic in its operation, requiring no particular skill of an operator.

The invention will be best understood if reference be made to the accompanying drawings which constitute parts of this specification, and in which—

Figure 2 is a diagrammatic top view of the outer mold, the core, the fires and the blow pipe parts being shown in section taken on the line 2—2 of Figure 1;

Figure 3 is a vertical sectional view of the chuck for the outer blank, taken on the line 3—3 of Figure 1;

Figure 4 is a view in elevation of the core for the inner blank and its associated parts;

Figure 5 is a plan view of the core for the inner blank and its associated parts, and;

Figure 1:
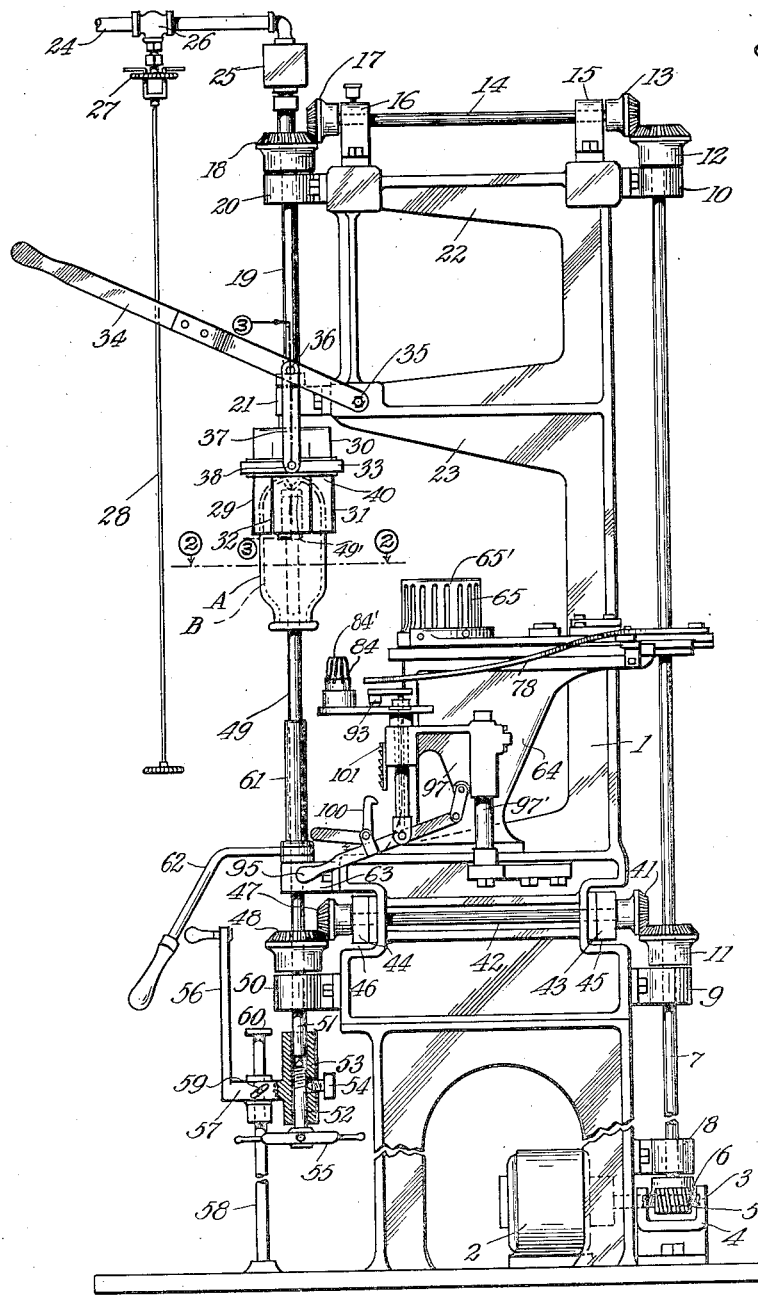
Figure 1 is a view of the machine in side elevation, with burners omitted to facilitate the illustration of the machine.

Figures 6 to 11, inclusive, are views showing the conditions of the blanks of one type of vacuum bottle during successive stages of the process.

Referring to the drawings, 1 is the frame of the machine in the lower part of which is mounted the motor 2. The shaft 3 of this motor is suitably borne by a casting 4, and carries a worm 5 that meshes with and drives a gear 6 secured to the lower end of a shaft 7 that is mounted to rotate in bearings 8, 9 and 10 which are fixedly secured to the frame 1, and said shaft 7 is provided with beveled pinions respectively disposed above and supported by said bearings 9 and 10.

The pinion 12 meshes with another beveled pinion 13 that is mounted on one end of a horizontal shaft 14, rotatively supported by bearings 15 and 16 secured to the upper end of the frame 1, and said shaft 14 carries at its other end a beveled pinion 17, which, in turn, meshes with a further beveled pinion 18.

Said pinion 18 is fixed to the upper end of a hollow shaft 19, mounted in water cooled bearings 20 and 21, which are carried at the ends of arms 22 and 23, respectively, extending laterally from the frame 1, and said hollow shaft 19 is in communication with an air pipe 24 which leads from a source of air under pressure whereby, as hereinafter described, the neck of the product, while still hot enough to be molded and during the molding operation, may be subjected to air pressure sufficient to blow the glass walls of the neck against the walls of the molds. The upper end of the hollow shaft 19 is adapted to turn in a box 25 which is connected to the down-turned end of the pipe 24, and this pipe 24 has a valve 26 that is provided with a handle 27 to which may be affixed, if desired, an actuating rod 28 terminating near the hand of the operator.

A chuck for holding an outer blank A is seen at 29, this element being secured to the hollow shaft 19 and driven thereby. Said chuck has an inflexible body portion 30 into which the hollow shaft 19 extends, and a downwardly-extending skirt 31 having slits 32 which admit of its contraction when the outer blank is to be grasped. The skirt 31 is slightly tapered so that it may be contracted by a sleeve or ring 33 which may be forced down around it by a lever 34, pivoted to the frame arm 23 at 35, and connected at the points 36 with links 37 to which said sleeve is pivoted at 38, 38. The sleeve is slightly tapered so as to conform to the taper of the skirt of the chuck, and the chuck is interiorly lined, as shown at 39, Figure 3, with some material, such as asbestos, which is sufficiently yielding to admit of a firm grasping of the blank without fracturing of the glass. The body portion of the chuck 29 is hollow, and encloses a gauge or stop 40 for the outer blank, thus determining the position of the outer blank in the chuck. The outer blank A is indicated by dotted lines in Figure 3, and is provided with tubulation or an opening 41 through which air, supplied by the pipe 24, may be admitted to the space between the inner and the outer blank to provide air pressure for molding the neck of the bottle.

The pinion 11 meshes with another pinion 41 carried by a shaft 42 which has bearings 43 and 44 set in recesses 45 and 46 of the frame 1, respectively, and the shaft 42 carries also a further pinion 47 which is in mesh with a pinion 48 splined to a shaft 49 that is capable of moving vertically within it, whereby said shaft 49 may be lifted while rotating and thus raise an inner blank B resting on the top of shaft 49, to a position within an outer blank held by the chuck 29. The pinion 48 is sustained by a bearing 50 that is attached to the frame 1, and the shaft 49 is mounted to rotate in this bearing.

The upper end of the shaft 49 is provided with a fire-proof cushioning 49', such as asbestos, and the lower end 51 thereof rests on a pointed screw 52 which engages screw threads on the inside of a sleeve 53, thus providing means for securing fine adjustments of said shaft in a vertical direction. A set screw 54 fixes said pointed screw 52 in any desired position in said sleeve 53, and a suitable device 55 may be attached to the screw 52 as a means for turning it. The sleeve 53 has a handle 56 extending upward from a bracket 57 which unites it to said sleeve, and this bracket is slidably mounted on a vertical rod 58 with reference to which it may be set in any of its vertical positions by a set screw 59. The rod 58 may be provided with a stop 60 which limits the height to which the bracket 57 may be raised.

Idly mounted on the shaft is a sleeve 61 which is provided with a handle 62 for moving it by hand. This sleeve 61 is sustained by a bearing 63 on which it rests when not in use, said bearing being fixed to the frame 1.

An outer mold 65, preferably made of graphite, having vent slots 65', comprising two semi-cylindrical parts 66 and 67 and interiorly conforming to the shape to be given to the outside of the neck of the finished product, is mounted on the bracket 64, secured to the frame 1 in substantially the plane extending horizontally through the necks of the blanks when these blanks are concentrically disposed within the chuck 29. The parts 66 and 67 of the mold are fixed to arm 68 and 69, respectively, and said arms are pivoted at the same point 70 to a sliding block 71 which runs in a guide 72, mounted on the bracket 64, so that the mold 65 may be moved to and from the work in the chuck. A stop member 72' horizontally extending from the guide 72, limits the forward position of the sliding block 71. Links 73 and 74, constituting a toggle lever, unite the rearwardly-projecting ends of the arms 68 and 69, and these links are actuated by a toggle block 75 which moves in grooves of the sliding block 71 and to which said rearwardly-projecting ends are pivoted at 76. A spring 77, connected to these rearwardly-projecting ends, normally holds the two parts of the mold 65 separated. An actuating handle 78 mounted on a link 79, carried by a fixed arm 80 attached to bracket 64, is pivoted to the toggle block 75 at 81. The mold 65 is actuated by moving the lever 78 that advances the block 75, which, in turn, on account of its pivotal connection 76 and the tension of the spring 77, forces forward the two arms 68, 69 and the block 71. When the sliding block 71 strikes the stop 72' the forward movement of the mold parts 66, 67 is arrested, and at this position the center of the mold 65, when closed will be concentric with the shaft 49, the closure of the mold being effectuated by a further forward movement of the block 75 actuating the toggle links 73, 74 against the tension of the spring 77 forcing the arms 68, 69 and the mold parts 66 and 67 together.

For the purpose of forming the interior shape of the bottle neck, a core 84 is employed. This core is provided with vent slots 84', and is made from material similar to that of the outer mold 65. This core is divisible, as shown in Figure 5, 85 and 86 being the separable parts thereof which are carried by arms 87 and 88 having a common pivoted point 89. The rear ends 90 and 91 of these arms are spaced apart to admit of the use of a spring 92 which holds these ends, separated, to thereby compel the parts of the core to normally be in contact. A conical wedge 93, suitably connected with an actuating rod 94, is the means for opening the parts of the core when it is to be swung into concentric relation with the shaft 49 which sustains said inner blank B within the outer blank A. A lever 95 is fulcrumed on a link 96 pivoted to the bracket 97, which in turn is rotatively mounted on a standard 97' secured to the frame 1. The lever 95 is pivotally connected with a clevis 94' which, in turn, is secured to the rod 94. A sleeve 98, shorter than said rod, actuated by said clevis on which it rests, and having at its upper extremity a flanged collar 99 by means of which said rod and the arms 87, 88 are caused to move in unison, is slidably mounted in the bracket 97. This sleeve surrounds the rod 94. A dog 100 engages the teeth of a rack 101 to hold the lever 95, and, consequently, the core 84 in a predetermined position within the neck of a bottle. When the dog 100 is released, the lever 95 is lowered until the collar 99 rests upon the bracket 97, additional depression of the lever 95 draws the rod 94 down and forces the wedge 93 between the arms 87 and 88 thereby opening the core 84 to admit of its swinging away from the shaft 49 which it circumscribes when in position in the neck of a bottle.

In Figure 2, two multiple burners 82 and 82' and a single burner 83 are shown surrounding and near the outer blank A. These burners are supplied with a mixture of gas and air, and are under any well known valvular control not shown in the drawings.

In starting the process, one of the outside blanks such as A, Figure 6 is placed in the chuck 29 until it rests against the stop 40 and is secured in said chuck by actuating the hand lever 34 forcing the sleeve 33 down and compressing the lower end of the chuck 29. An inner blank, such as B, Figure 6, is poised on the top of the shaft 49, which is then elevated by actuating the lifting mechanism at the lower end of the shaft controlled by handle 56 and parts as described, until the inner blank B is in proper position within the outer blank A. The motor 2 is then started, causing the two blanks to synchronously rotate. The burner fires are then started with flames of mild intensity to preheat the blank, after which preheating the intensity of the flames is increased and said flames are focused upon a narrow zone causing the glass to soften within that area. The softening of the glass is followed by a lengthening of the outer blank, due to gravity, and by a consequent attenuation of the viscuous glass shown in Figure 7. The force of the flames may also contribute to the production of this result. The sleeve 61 is raised by the handle 62 until it is within the neck portion of the outer and inner blanks. The outer blank A continues to be attenuated by gravity and the force of the flames, until it strikes and adheres to the lower extremity of the inner blank B. Continued application of the flames causes further contraction of the attenuated section until it strikes the sleeve 61, which may be raised and lowered to effect a separation of the excess glass A', shown in Figure 8. The fires 82, 82' and 83 are concentrated at the junction of the inner and the outer blank to the extent necessary to make a fused union at this point.

The inner core 84 is opened by actuation of the lever 95, as described, and swung into position and closed so that it circumscribes the shaft 49. This core is then raised to a position within the neck of the inner blank B, as shown in Figure 9, and secured therein by the locking of the dog 100 in the rack 101. The fires are continuously applied to the lower section of the outer blank A, keeping the glass at this point in a pliable condition. By the movement of the lever 78, the outer mold 65 is advanced until it concentrically encloses the lower end of the bottle, which is in a pliable condition. As soon as the mold 65 is thus positioned, the air valve 26 is opened and air pressure is introduced between the inner blank B and the outer blank A, through the tubulation 41, forcing the pliable glass against the walls of the core and the outer mold, forming the neck of the finished product into a desired shape, as shown in Figures 10 and 11. The air valve 26 is then closed, the molds are removed, and a mild intensity annealing flame is directed at the neck of the bottle. The finished bottle is removed from the machine by lowering the shaft 49 and releasing said bottle from the chuck 29.

While the drawings illustrate the preferred embodiments of the invention, nevertheless, various changes may be made without departing from the spirit of the invention, and I therefore do not limit myself to the constructional features as shown, but wish to avail myself of any modifications constituting departures within the scope of the invention as defined in the appended claims.

I claim:

1. An assembling machine for glass blanks, including means for bringing an inner and an outer hollow blank into concentric relations with the open ends of said blanks downward, means for synchronously rotating said blanks, fires for heating the pendent edges of said blanks, internal means for sustaining the lower end of the inner blank and means for uniting and shaping said pendent edges.

2. An assembling machine for glass blanks, including a chuck for an outer blank, a spindle for an inner blank, a sleeve surrounding said spindle, means for raising said spindle while rotating to thereby place an inner blank within an outer blank and effectuate its rotation synchronously with said outer blank, fires for heating the end of the outer blank, and a mold having separable parts for enclosing and shaping the heated product.

3. An assembling machine for glass blanks, including means for holding and rotating an outer blank, means for synchronously rotating an inner blank with said outer blank, fires for heating the end of the outer blank, a two-part mold, pivoted arms for the parts of said mold, a spring for opening said mold from around a part of said outer blank, and means for advancing and closing said mold.

4. An assembling machine for glass blanks, including means for synchronously rotating an outer and an inner blank, fires for heating the end of the outer blank, a two-part mold, pivoted arms for said mold, a spring for opening said mold, a toggle lever attached to said arms, a plurality of slides arranged to effectuate manipulation of said arms when the mold is moved to and from the blanks, and a lever for actuating said several parts.

5. An assembling machine for glass blanks, including means for synchronously rotating an outer and an inner blank, fires for heating the end of the outer blank, a mold for giving external shape to the finished product, and a core independent of said mold for forming the internal shape of the mouth of said product during said operation.

6. A machine for uniting glass blanks, including an outer mold, parts of an inner core cooperating with said mold, pivoted arms for said parts, a sleeve carrying said arms, a wedge and a spring for respectively separating and bringing together said arms, a rod connected at its upper end with said wedge and extending downward through said sleeve, an oscillatory element, and a lever pivoted on said element, and attached to the lower end of said rod and adapted, when lifted, to actuate said sleeve after said wedge has been raised to its inoperative position to thereby lift said core to its operative position.

In testimony whereof I affix my signature.

ERICH H. ROHL.